United States Patent
Endo et al.

[11] Patent Number: 5,148,413
[45] Date of Patent: Sep. 15, 1992

[54] NARROW BAND DISTURBING WAVE DETECTING DEVICE

[75] Inventors: Mamoru Endo; Yoshitaka Uchida, both of Tokyo, Japan

[73] Assignee: Clarion Co., Ltd., Tokyo, Japan

[21] Appl. No.: 836,988

[22] Filed: Feb. 14, 1992

[30] Foreign Application Priority Data

Feb. 25, 1991 [JP] Japan .................. 3-53444

[51] Int. Cl.$^5$ .................. H04B 15/00
[52] U.S. Cl. .................. 367/135; 375/1
[58] Field of Search .................. 367/135; 375/1; 333/193; 310/313 R

[56] References Cited

U.S. PATENT DOCUMENTS 5,028,101  7/1991  Sugai et al. .................. 333/193

FOREIGN PATENT DOCUMENTS 3-174831  7/1991  Japan .
4-44436   2/1992  Japan .

Primary Examiner—Daniel T. Pihulic
Attorney, Agent, or Firm—Flynn, Thiel, Boutell & Tanis

[57] ABSTRACT

A device according to the present invention comprises a variable notch filter, a PN code generator, a VCO and a convolver. The frequency is swept within the band of the convolver by the VCO after having stopped operations of the variable notch filter and the PN code generator and the output of the convolver at this time is detected. When the output thus detected exceeds a threshold, a detected signal is sent to the variable notch filter to control the notch part thereof so as to correspond to disturbing wave to remove the disturbing wave from a received signal. Since the convolver is used not only for a correlator but also for a disturbing wave detector, the construction can be simple and cheap.

4 Claims, 6 Drawing Sheets

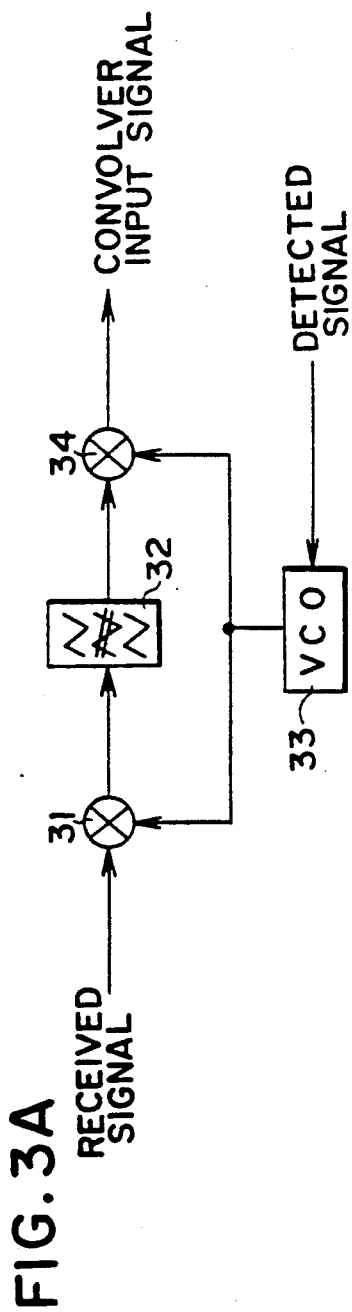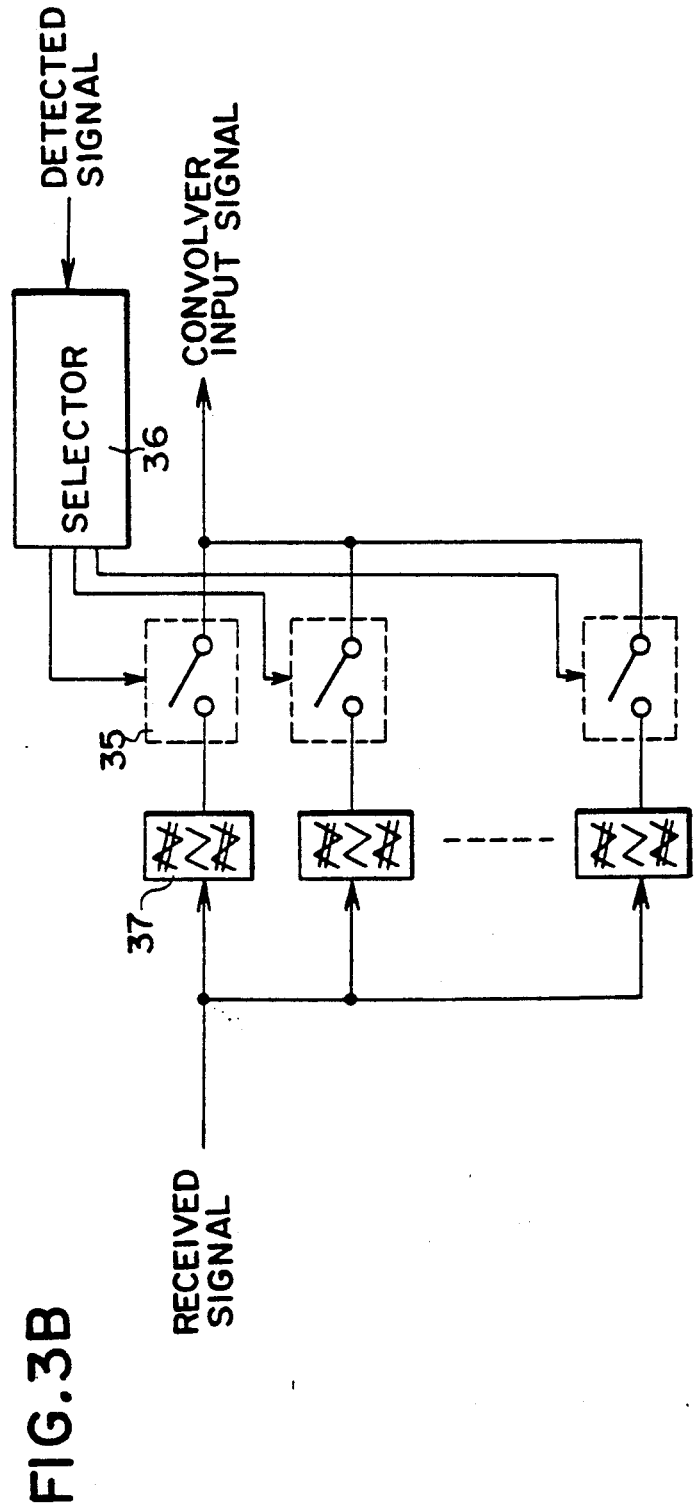
FIG. 3A
FIG. 3B

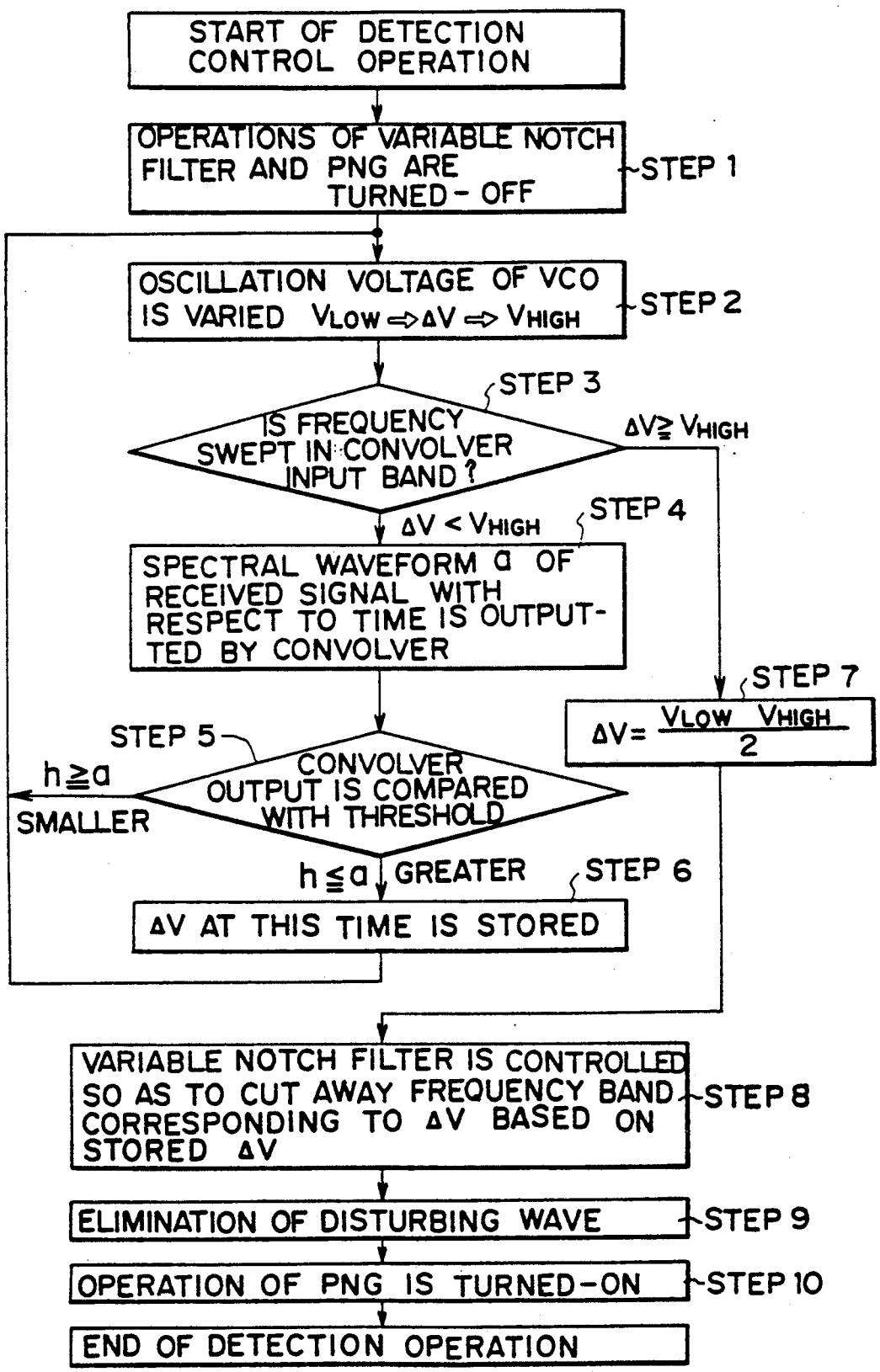

NARROW BAND DISTURBING WAVE DETECTING DEVICE

FIELD OF THE INVENTION

The present invention relates to a narrow band disturbing wave detecting device, and in particular to an improvement thereof, using a surface acoustic wave (SAW) convolver as a correlator for detecting disturbing waves.

BACKGROUND OF THE INVENTION

FIG. 2 shows a prior art narrow band disturbing wave detecting device, in which reference numeral 11 is a disturbing wave detecting circuit and 12 is a variable notch filter. Disturbing wave in a received signal in a desired frequency band is detected by the disturbing wave detecting circuit 11. The disturbing wave in the received signal is removed to output only desired wave as an output signal by making the notch filter frequency of the variable notch filter 12 in accordance with a disturbing frequency corresponding to a detected signal thus obtained.

However such a prior art method has a problem that the construction of the device is complicated and expensive, because a special disturbing wave detecting circuit is required for detecting disturbing wave.

OBJECT OF THE INVENTION

The object of the present invention is to solve the prior art problem in a device, in which a surface acoustic wave convolver is used as a usual correlator, by using the convolver as a disturbing wave detector other than the convolver in common.

SUMMARY OF THE INVENTION

In order to achieve the above object, a narrow band disturbing wave detecting device according to the present invention comprises a surface acoustic wave convolver; a variable notch filter, to which a received signal is inputted and which supplies an output signal to one of two input transducers of the surface acoustic wave convolver and at the same time removes a band signal corresponding to a first control signal from the received signal; a variable frequency signal generator, whose output frequency varies, depending on a second control signal, and which supplies an output signal to the other transducer of the surface acoustic wave convolver; and disturbance detection control means, to which an output signal from the convolver is inputted and which outputs the first and the second control signal; wherein the disturbance detecting control means includes first means for generating the second control signal sweeping an output frequency of the variable frequency signal generator; comparing means for comparing the signal inputted from the convolver with a predetermined value to know whether the former exceeds the latter or not, and second means for generating the first control signal, depending on a result of the comparing means.

The frequency of the variable frequency signal given to the convolver is varied by the second control signal and thus the frequency of the convolver is swept in the band thereof. At this time, when the outputted signal exceeds the predetermined value, the first control signal is generated and the variable notch filter removes the signal in the band corresponding to the first control signal from the received signal.

BRIEF DESCRIPTION OF THE DRAWINGS

FIGS. 3A and 3B are block diagrams showing two examples of the construction of the variable notch filter used in the embodiment described above;

FIG. 6 is a flow chart for explaining the operation of the embodiment described above.

DETAILED DESCRIPTION

Figure 1:
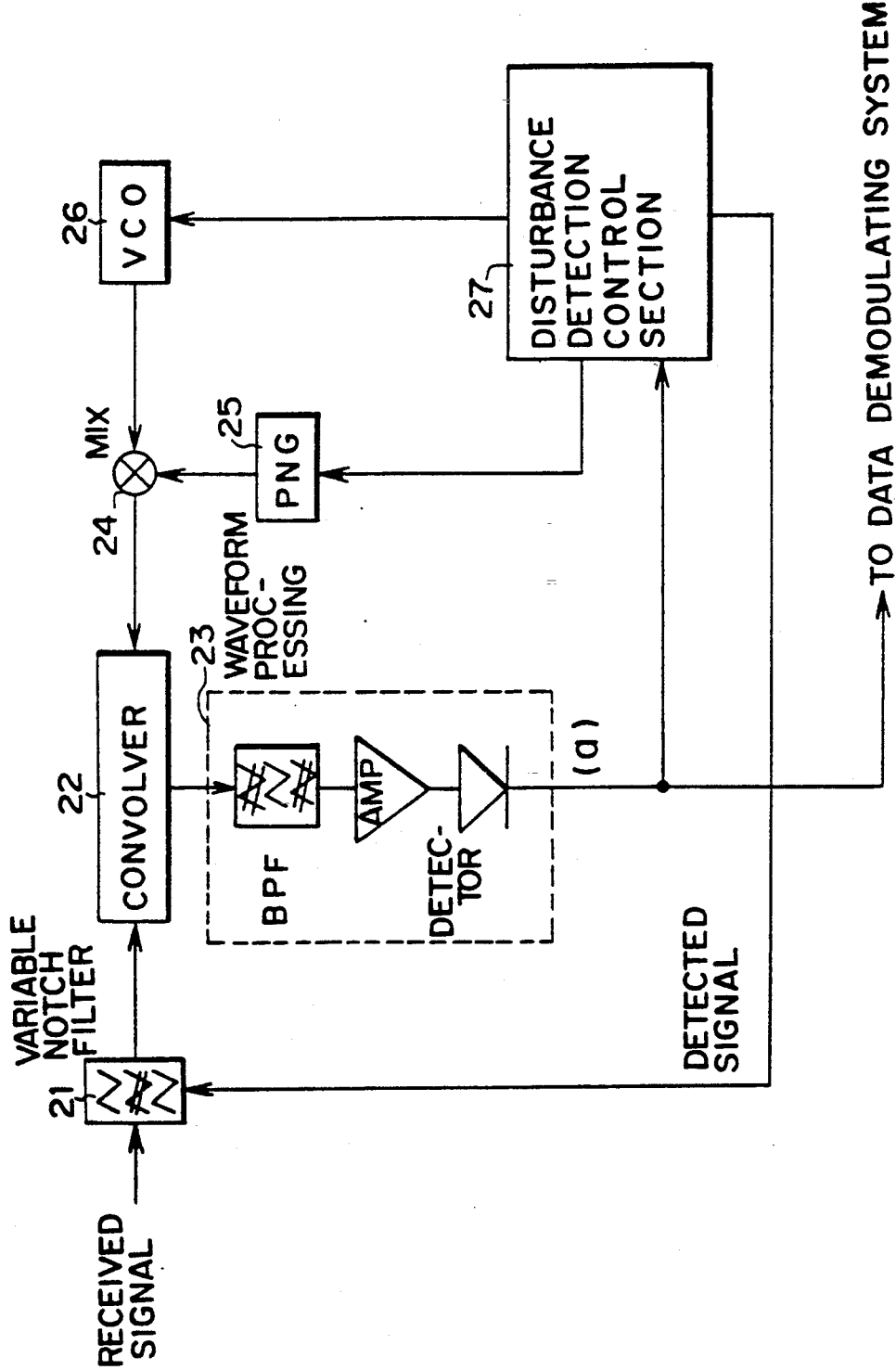
FIG. 1 is a block diagram showing an embodiment of the present invention.
Figure 2:
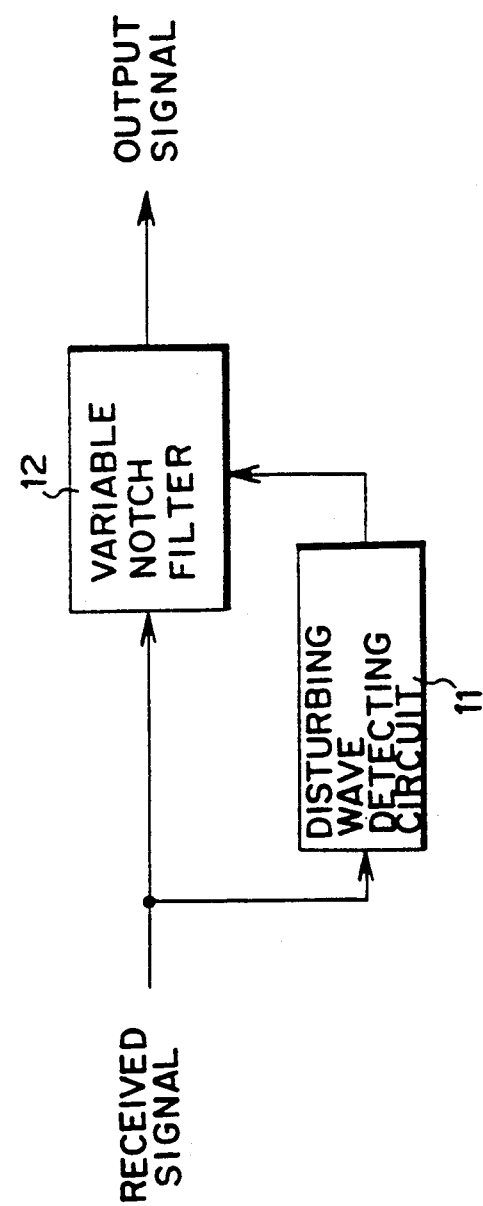
FIG. 2 is a block diagram representing a prior art device.

Hereinbelow the embodiment of the present invention indicated in the drawings.

FIG. 1 shows an embodiment of the narrow band disturbing wave detecting device according to the present invention used in a spread spectrum (SS) receiver, in which reference numeral 21 is a variable notch filter; 22 is a surface acoustic wave convolver; 23 is a waveform processing circuit consisting of a band pass filter BPF, an amplifier AMP and a detector D; 24 is a mixer; 25 is a PN code generator; 26 is a voltage controlled oscillator; and 27 is a disturbance detection control section.

Now, at first, in/output characteristics of the convolver will be explained. Supposing that the input received signal $C_1(t)$ and the reference signal $C_2(t)$, when the convolver 22 is used for the correlator, are represented by;

$$C_1(t) = A_1(t) \cdot \cos(2\pi \cdot f_1 \cdot t) \tag{1}$$

and $$C_2(t) = A_2(t) \cdot \cos(2\pi \cdot f_2 \cdot t) \tag{2}$$

respectively, the correlation output signal $C_3(t)$ is a sinusoidal signal as given by;

$$C_3(t) = A_3(t, \Delta f) \cdot \cos(2\pi \cdot f_3 \cdot \tau G) \tag{3}$$

where $$A_3(t, \Delta f) = \alpha \cdot A_1(t) \cdot A_2(t) \cdot B(\Delta f) \tag{4}$$

α: proportionality constant $$B(\Delta f) = \sin(\pi \cdot \Delta f \cdot \tau G)/\pi \cdot \Delta f \cdot \tau G \tag{5}$$

$$\Delta f = f_1 - f_2$$

τG ≈ delay time of convolver and $$f_3 = f_1 + f_2 \tag{6}$$

From Equation (6) the carrier frequency $f_3$ of the correlation output signal is the sum of the carrier frequencies of the two input signals. Further, from Equation (5), concerning the amplitude $A_3(t, \Delta f)$ of the correlation output, it can be seen that (i) $A_3(t, \Delta f)$ is proportional to the amplitude $A_1(t)$ of the received signal and the amplitude $A_2(t)$ of the reference signal and that (ii) $A_3(t, \Delta f)$ is proportional to $B(\Delta f)$. That is, it is obvious that it has attenuation characteristics proportional to sin $x/x$ ($x = \pi \cdot \Delta f \cdot \tau G$) with respect to the difference $\Delta f = f_1 - f_2$ in the carrier frequency between the received signal and the reference signal.

Consequently it can be understood that, using the attenuation characteristics of the convolver for a filtering function, the convolver can be used as a narrow band disturbing wave detector together with the function as a correlator for SS signal in common.

In the embodiment indicated in FIG. 1, since it is necessary to stop the usual SS correlation demodulation operation of the convolver during the narrow band disturbance detection operation, when the narrow band disturbance detection operation is started, the disturbance detection control section 27 turns-off the variable notch filter 21 and the PN code generator 25 and at the same time applies a voltage $\Delta V$ to the voltage controlled oscillator 26 to sweep the output frequency thereof within the band of the convolver.

Figure 4:
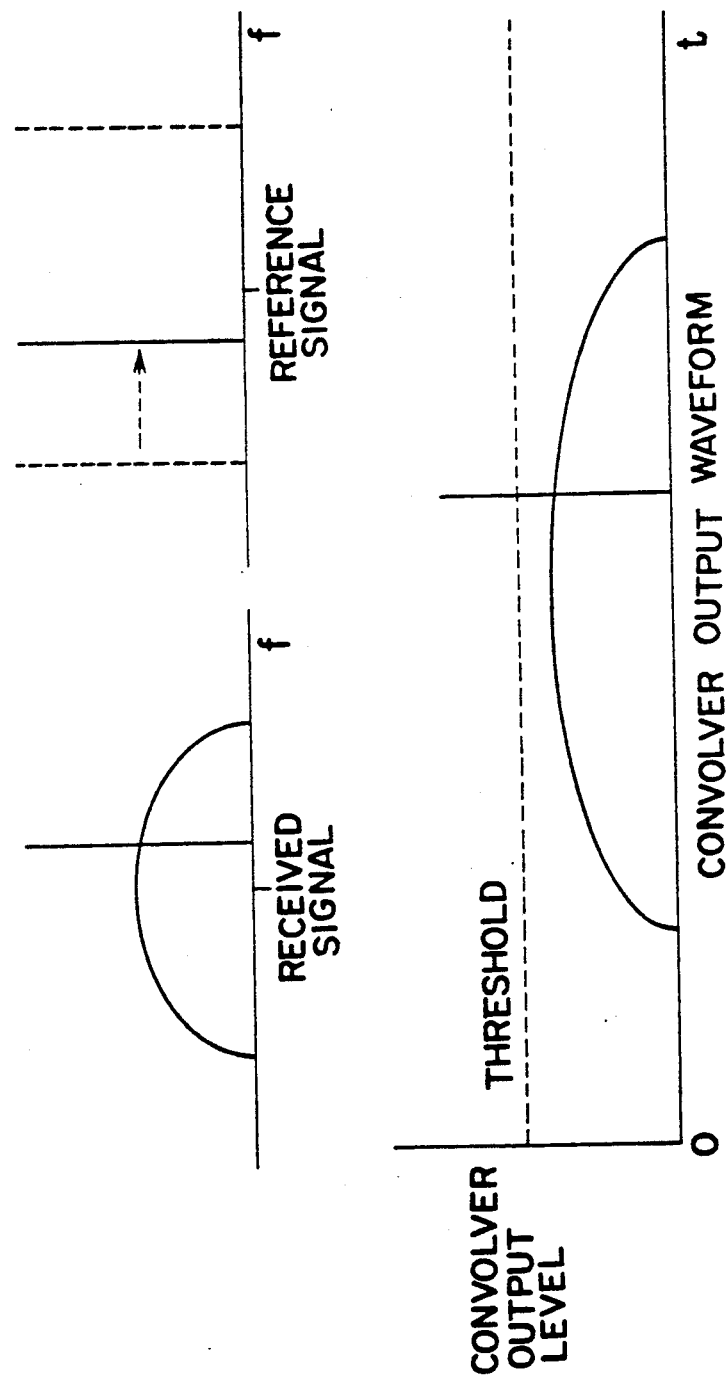
FIG. 4 indicates waveforms for explaining an operation of the embodiment described above.

In this way, as indicated in FIG. 4, the convolver 22 outputs a signal having a waveform with respect to the time corresponding to the variation speed of $\Delta V$ as described above, into which the received signal having a waveform with respect to the frequency is transformed. This output signal of the convolver is detected by the waveform processing circuit 23. The detection output is sent to the disturbance detection control section 27, in which it is compared with a predetermined threshold. When a detection output exceeding this threshold is detected, this means that disturbing wave is detected. Since the voltage $\Delta V$ controlling the voltage controlled oscillator 26 at that time indicates the frequency band, where disturbing wave exists, a detection signal $\Delta f$ corresponding to this $\Delta V$ is sent to the variable notch filter 21 to remove the detected disturbing wave by controlling the variable notch filter 21, using this signal.

FIG. 6 is a flow chart indicating the operation of the disturbance detection control section 27 described above, which consists of Steps S1 to S10. n Step S1, the operations of the PN code generator 25 and the variable notch filter 21 are turned-off. In Step S2, the oscillation voltage of the voltage controlled oscillator (VCO) is varied in a region of $\Delta V = V_{HIGH} \sim V_{LOW}$ to sweep the frequency within the band of the convolver 22.

In Step S3, it is judged whether $\Delta V > V_{HIGH}$ or not, i.e. whether the sweep described above is terminated or not. If $\Delta V < V_{HIGH}$, since this means that the process is in the course of the sweep, the detection output a of the convolver 22 is taken out in Step S4 and the output a is compared with the threshold (h) in Step 55. As the result, if $h \geq a$, the process returns to Step S2. On the contrary, if $h \leq a$, since this means that the disturbing wave is detected, $\Delta V$ at this time is memorized in Step S6 and the process returns to Step 2.

If $\Delta V \geq V_{HIGH}$ in Step S3, since this means that the sweep is terminated, the carrier in the convolver 22 on the reference signal side is fixed by setting $\Delta V$ at VLOW+VHIGH/2.

Next, in Step 8, the cut frequency band of the variable notch filter 21 is controlled by $\Delta V$ memorized in Step S6. In this way, in Step S9, the disturbing wave is removed in Step S9 and the PN code generator 25 is turned-on in Step S10.

FIGS. 3A and 3B indicate examples of the construction of the variable notch filter 21. In FIG. 3A, 31 and 34 are mixers; 32 is a notch filter; and 33 is a voltage controlled oscillator (VCO). The VCO 33 is controlled by the detection signal described above. The carrier from this VCO is multiplied by the received signal in the mixer 31, which is moved to the notch part of the notch filter 32 on the frequency axis to remove the narrow band disturbing wave. Then this frequency axis is converted again to the original frequency axis by the mixer 34.

In FIG. 3B, 35 is a plurality of switches; 36 is a selector; and 37 is notch filters having different frequencies. Only notch filters 37 having frequencies, where narrow band disturbing waves exist, are turned-off by the respective switches 35, responding to the detection signal to remove the disturbing waves described above.

When the removing operation is terminated in this way, the narrow band disturbance removing operation is stopped and the correlating operation of the convolver 22 is started to effect data demodulation.

Figure 5:
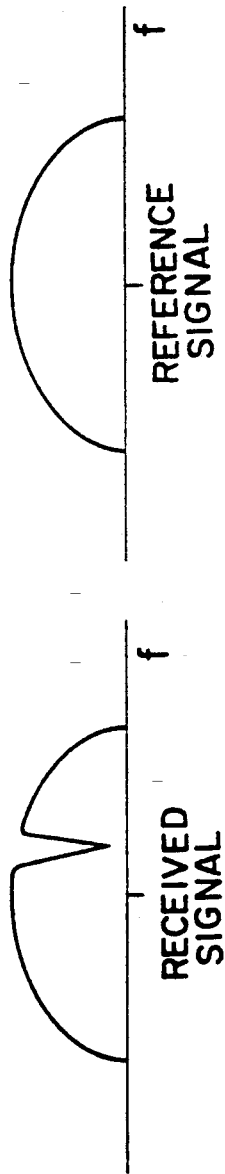
FIG. 5 indicates waveforms for explaining another operation of the embodiment described above.

FIG. 5 indicates a spectrum waveform of the input signal of the convolver 22 after the removal of the disturbing waves.

As explained above, according to the present invention, since the convolver used in an SS receiver, etc. is used also for the disturbing wave detector apart from the correlator, the construction can be simple and cheap.

What is claimed is:

1. A narrow band disturbing wave detecting device comprising:
   a surface acoustic wave convolver;
   a variable notch filter, to which a received signal is inputted and which supplies an output signal to one of two input transducers of said surface acoustic wave convolver and at the same time removes a band signal corresponding to a first control signal from said received signal;
   a variable frequency signal generator, whose output frequency varies, depending on a second control signal, and which supplies an output signal to the other transducer of said surface acoustic wave convolver; and
   disturbance detection control means, to which an output signal from said convolver is inputted and which outputs said first and said second control signal;
   wherein said disturbance detection control means includes first means for generating said second control signal sweeping an output frequency of said variable frequency signal generator; comparing means for comparing the signal inputted from said convolver with a predetermined value to know whether the former exceeds the latter or not, and second means for generating said first control signal, depending on a result of said comparing means.

2. A device according to claim 1 wherein the sweep of the frequency by said variable frequency signal generator by said first means is effected within the band of said convolver.

3. A device according to claim 1 wherein said variable notch filter includes a notch filter; a first mixer connected with the input thereof; a second mixer connected with the output thereof; and a voltage controlled oscillator; wherein an output of said oscillator depending on said second control signal is given to said first and said second mixer.

4. A device according to claim 1 wherein said variable notch filter includes a plurality of notch filters, a plurality of switches and a selector, wherein said selector drives one of the switches, responding to said second control signal to select one of the notch filters.

* * * * *